(12) United States Patent
Goupy et al.

(10) Patent No.: US 10,244,018 B2
(45) Date of Patent: Mar. 26, 2019

(54) CONTROLLING BLUETOOTH MULTIMEDIA DEVICES

(71) Applicant: TAP SOUND SYSTEM, Fontenay-sous-Bois (FR)

(72) Inventors: Julien Goupy, Fontenay-sous-Bois (FR); Thomas Girardier, Fontenay-sous-Bois (FR)

(73) Assignee: TAP SOUND SYSTEM, Fontenay-sous-Bois (FR)

( * ) Notice: Subject to any disclaimer, the term of this patent is extended or adjusted under 35 U.S.C. 154(b) by 0 days.

(21) Appl. No.: 15/655,585

(22) Filed: Jul. 20, 2017

(65) Prior Publication Data
US 2018/0027034 A1 Jan. 25, 2018

(30) Foreign Application Priority Data
Jul. 22, 2016 (FR) ...................... 16 57050

(51) Int. Cl.
*H04L 29/06* (2006.01)
*H04W 80/00* (2009.01)
(Continued)

(52) U.S. Cl.
CPC ...... *H04L 65/4076* (2013.01); *H04L 65/1046* (2013.01); *H04L 65/608* (2013.01);
(Continued)

(58) Field of Classification Search
CPC ............. H04L 65/4076; H04L 65/1046; H04L 65/608; H04L 65/80
See application file for complete search history.

(56) References Cited

U.S. PATENT DOCUMENTS

| 2003/0002473 A1* | 1/2003 | Goodings | ............. H04L 1/0061 370/349 |
| 2006/0116075 A1* | 6/2006 | Gallo | ................... H04L 12/189 455/41.2 |

(Continued)

FOREIGN PATENT DOCUMENTS

FR 2920930 A1 3/2009

OTHER PUBLICATIONS

Jian, H., et al., "Point-to-Multipoint Stereo Audio Transmitting System Based on Bluetooth," International Conference on Communication and Mobile Computing, 2010, pp. 323-328.
(Continued)

*Primary Examiner* — Ryan J Jakovac
(74) *Attorney, Agent, or Firm* — Young & Thompson (57) ABSTRACT

Disclosed is a device (DEV) for controlling Bluetooth multimedia devices, the controlling device including a Bluetooth chip (BC) arranged to implement a modified A2DP profile (A2DP') so as to create a point-to-multipoint link (LNK) from the Bluetooth chip to several Bluetooth multimedia devices (SPK1, SPK2, SPKN), the Bluetooth chip of the controlling device being arranged to stream several interconnected multimedia streams, each to a respective Bluetooth multimedia device from among the several Bluetooth multimedia devices, based on a non-blocking Bluetooth usage. The description also refers to a method for controlling Bluetooth multimedia devices, to a computer program arranged to implement such a method as well as to a storage medium storing such a computer program.

7 Claims, 2 Drawing Sheets

(51) Int. Cl.
*H04L 29/08* (2006.01)
*H04W 4/80* (2018.01)

(52) U.S. Cl.
CPC .............. *H04L 65/80* (2013.01); *H04L 69/32* (2013.01); *H04W 4/80* (2018.02); *H04W 80/00* (2013.01)

(56) References Cited

U.S. PATENT DOCUMENTS

| | | |
|---|---|---|
| 2009/0175214 A1 | 7/2009 | Sfar et al. |
| 2009/0234983 A1* | 9/2009 | Golden ................ G06F 3/14 710/30 |
| 2011/0129048 A1 | 6/2011 | Barbe et al. |
| 2012/0058727 A1* | 3/2012 | Cook .................. H04R 5/02 455/41.3 |
| 2012/0163246 A1* | 6/2012 | Wang .................. H04L 1/1832 370/277 |
| 2014/0029701 A1 | 1/2014 | Newham et al. |

OTHER PUBLICATIONS

"SIG: Bluetooth Specification Version 4.2, Retransmission and Flow Control Option," Bluetooth Specification Version 4.2, vol. 3, 2014, pp. 96-101.

* cited by examiner

CONTROLLING BLUETOOTH MULTIMEDIA DEVICES

BACKGROUND OF THE INVENTION

Field of the Invention

The object of the description is a system for controlling Bluetooth multimedia devices, particularly Bluetooth speakers (Bluetooth is a registered trademark of Bluetooth SIG, Inc.).

Bluetooth is a communication standard that is well-known to the person skilled in the art, defined since 1994 and managed by a group of organizations (Bluetooth SIG) that has issued successive versions. The current version is version 4.2 and version 5 has just been announced. Bluetooth enables a short-distance bidirectional exchange of data (this is a piconet network, which designates a network covering a personal zone). Therefore, the range of Bluetooth equipment is limited to a few tens of meters. Bluetooth uses radio waves that are situated in the UHF band (between 300 MHz and 3 GHz). Bluetooth aims to simplify connections between electronic devices by removing cable connections. Thus Bluetooth enables cables between a source multimedia device (hi-fi system, car radio, computer, tablet, mobile telephone, etc.) to be replaced by wireless communications and target multimedia devices such as speakers arranged to play a received multimedia stream.

Bluetooth speakers have met with a certain success due to their high portability.

However, the Bluetooth standard does not allow a Bluetooth chip to transmit several audio streams in parallel to several multimedia devices that one wishes to synchronize, if an audio data exchange profile called the A2DP profile is used. This A2DP profile does not allow a synchronized point-to-multipoint transmission to be performed. In fact, the Bluetooth standard indicates: "The following restrictions are applied to this profile: 1. The profile does not support a synchronized point-to-multipoint distribution." Thus, it is not possible in theory to design a device for the synchronized controlling of Bluetooth multimedia devices, the synchronized controlling device comprising a single Bluetooth chip to control several multimedia devices, because Bluetooth does not allow this.

Creating a point-to-multipoint Bluetooth device to several speakers has already been proposed. For example, application FR2920930, filed on 6 Sep. 2007 and now definitively lapsed, proposed such a device. But this application did not describe how to produce such a device, which seems impossible in view of the Bluetooth standard if only a Bluetooth chip is used. The insufficient description of this application prevents a relevant teaching regarding the manner of achieving a point-to-multipoint link, let alone a synchronized point-to-multipoint link, from being learned.

Although Bluetooth does not provide it, it would be possible to create several Source SEPs in a Bluetooth device controlling chip in order to control several Bluetooth devices (instead of providing, in a controlling circuit, as many Bluetooth chips as there are Bluetooth devices to be controlled). A SEP is a "Stream End Point." Bluetooth communications are carried out point-to-point between two SEPs. A SEP represents the resources and capacities of a device. For example, a device such as a portable telephone may have three SEPs, one representing its video receiver capacities, another representing its audio receiver capacities with an SBC codec and a last representing its audio receiver capacities with an aptX codec. Each codec must be associated with a SEP that is different from that or those to which one or more codec(s) is or are associated, but a same codec can be associated with several SEPs.

However, in the case where Bluetooth devices are Bluetooth multimedia devices, the problem of synchronizing signals transmitted to each of these Bluetooth multimedia devices in A2DP is posed.

The A2DP acronym means "Advanced Audio Distribution Profile." The conventional A2DP profile defines a set of protocols and procedures for exchanging audio data through the Bluetooth protocol between a Source device and a Sink device, "Sink" designating the ultimate destination of a stream, for example a Bluetooth speaker. This A2DP profile is constructed from several building blocks defined by the Bluetooth standard.

In particular, the profile is based on low-level building blocks that are well-known to the person skilled in the art. These building blocks include:
- a "Baseband" building block (the Baseband building block being identified by the reference BB in FIG. 1),
- an "LMP" ("Link Manager Protocol") building block,
- an "L2CAP" ("Logical Link Control and Adaptation Protocol") building block,
- an "SDP" ("Service Discovery Protocol"). These building blocks are the protocols defined in the Bluetooth standard.

Figure 1:
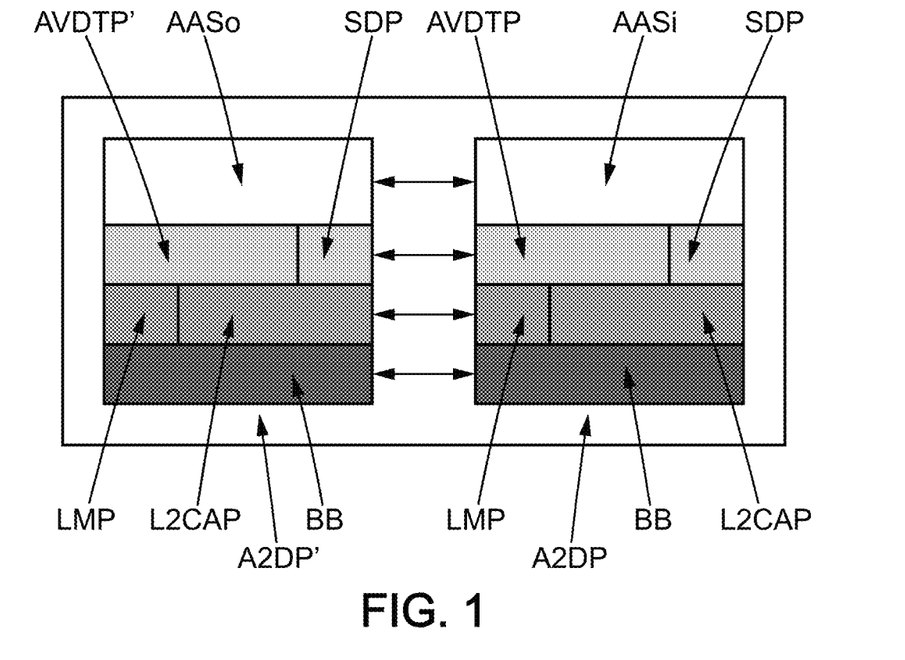
FIG. 1 illustrates a conventional A2DP profile as well as an A2DP' profile according to an embodiment of the invention arranged to communicate with the conventional A2DP profile.

The A2DP profile is also based on a high-level layer called the application layer (references AASo and AASi in FIG. 1, respectively for "Application Audio Source" and "Application Audio Sink."). This is the layer in which the device determines the transport parameters and the various available services. This is also the level where the choice of codec used to transmit audio data is made (which may involve decoding followed by re-encoding, when the audio stream to be transmitted is already encoded, which is usually the case).

Lastly, the A2DP profile is based on an AVDTP ("Audio/Video Distribution Transport Protocol") building block which defines the binary transactions between Bluetooth devices for establishing a stream and for streaming an audio stream and/or a video stream using L2CAP. Therefore this covers procedures for establishing the audio stream, negotiating the audio stream parameters and transmitting the audio stream data. AVDTP comprises a signaling entity for negotiating streaming parameters and a transport entity for managing the stream itself. AVDTP defines a protocol for transporting audio and/or video data. More specifically, the AVDTP relates to the transport of audio and/or video data between two SEPs.

A limitation imposed by the AVDTP according to the Bluetooth standard is that when a connection was negotiated between two SEPs, these two SEPs must be locked to each other to deliver the stream. By default, a connected SEP refuses any new connection. In recent Bluetooth products, a "social mode" function sometimes allows this default behavior to be changed. But this "social mode" function that enables a new connection interrupts the connection in progress. Thus, for example, one can be in the presence of two telephones connected to the same Bluetooth speaker. But several simultaneous transports cannot be established. Switching to a new connection is typically done by terminating the previous connection while keeping the previous connected telephone in memory. Consequently, if one has only one audio source SEP on a Source device, then a single AVDTP transport to a given Sink device can be established at a given time, according to the Bluetooth standard.

The L2CAP layer defines the minimum protocol for exchanging data of the Bluetooth specification. In particular, the L2CAP layer enables packet segmentation and reassembly, multiplexing and quality of service. The various transport protocols (such as AVDTP) underlying the various Bluetooth profiles (such as A2DP) come from this L2CAP layer. An L2CAP channel is created between a CID ("Channel Identifier") of a source device and a CID of a sink device, enabling the exchange of data between these two devices. Each L2CAP channel is programmed, specifically enabling the control of data streams transiting in channels that L2CAP defines (L2CAP channels) to be managed. To do this, various parameters can be taken into account independently for each L2CAP channel, particularly:

An FTO or "Flush Timeout" parameter defines an expiration period for a data packet in a buffer memory of a source device. This period is infinite by default (blocking mode), which means that a transmitted packet that does not arrive at destination is resent as long as no packet (the initial packet or resent packets) has reached its destination. But the period can also be such that there may never be retransmission (if the "Flush Timeout" parameter is set to an appropriate value defined by the Bluetooth standard), which amounts to a null period. The period can also take a finite value. In addition, a boolean value exists called a "flag non-automatically flushable" that is present in Bluetooth packets, indicating that the relevant packet cannot be automatically flushed.

A QoS ("Quality of service") parameter specifically defining the maximum latency between the inclusion of a packet to be transmitted in a L2CAP channel and its effective transmission.

Parameters called "Extended Flow features," replacing and supplementing the combination of the aforementioned "Flush Timeout" and "QOS" parameters.

These parameters are negotiated between the Bluetooth stack of a source Bluetooth device and the Bluetooth stack of a sink Bluetooth device and, outside of default values, are not still supported.

L2CAP enables the implementation of different modes. These modes are also L2CAP channel parameters, in the same way as the "Extended Flow features" parameters or the "Flush Timeout" parameter. All of these parameters (modes included) enable the control of streams to be modified. Each mode defines different procedures for managing data streams. In the classic Bluetooth context (called BR/EDR), five operating modes are possible for a L2CAP channel. These modes are:

"Basic Mode" (basic mode L2CAP),
"Flow Control Mode,"
"Retransmission Mode,"
"Enhanced Retransmission Mode" (called "ERTM") and
"Streaming Mode" (called "SM").

"Basic Mode" is the default mode and is supported by all Bluetooth stacks. It requires no programming. "Flow Control Mode" sends packets but never retransmits lost packets. However, these packets (called PDUs) are detected when they are lost, and the "Flow Control Mode" enables the communication of a report listing the lost packets. "Flow Control Mode" and "Retransmission Mode" can only be used if "ERTM" and "SM" are not usable. These two modes ("Flow Control Mode" and "Retransmission Mode") are seldom used. Specifically, "ERTM" enables a given maximum number of retransmissions to be taken into account, a given maximum duration during which a retransmission can intervene to be taken into account and enables untransmitted or improperly transmitted packets to be identified. "SM" is adapted to asynchronous data streams. It takes a finite "Flush Timeout" parameter into account. With the Bluetooth receiver, if the buffer memory is full, then the previous data are overwritten.

In the Bluetooth standard, a parameter called "Retransmission and flow control option" enables a mode to be chosen. The Bluetooth standard recommends establishing reliable connections limiting data losses, by using a "Basic Mode" with an infinite "Flush Timeout," or on more recent Bluetooth stacks, "ERTM" with any "Flush Timeout."

In practice, no product on the market offers a synchronized point-to-multipoint A2DP control function for any Bluetooth multimedia devices.

BRIEF SUMMARY OF THE INVENTION

The invention aims to improve the situation.

The invention relates in particular to a device for controlling Bluetooth multimedia devices, the controlling device comprising a Bluetooth chip arranged to implement a modified A2DP profile so as to create a point-to-multipoint link from said Bluetooth chip to several Bluetooth multimedia devices, the Bluetooth chip of the controlling device being arranged to stream several interconnected multimedia streams, each to a respective Bluetooth multimedia device from among said several Bluetooth multimedia devices, based on a non-blocking Bluetooth usage.

This device is advantageous in that it enables a single Bluetooth chip to be used to control several Bluetooth multimedia devices, even though the Bluetooth standard does not provide such a possibility. It therefore is possible to modify the A2DP profile without violating the Bluetooth standard, by enabling a point-to-multipoint link that is not provided in the standard. Thus, interoperability is preserved (Bluetooth functions are supported normally). There is no violation in the Bluetooth standard insofar as the device only adds a function not initially provided without disrupting existing functions. In addition, the non-blocking Bluetooth usage prevents streamed multimedia streams from being desynchronized.

The device according to the invention may comprise one or more of the following characteristics taken alone or in combination.

The invention specifically relates to a device for controlling Bluetooth multimedia devices in which the Bluetooth chip is arranged, when a multimedia stream packet that it transmitted to a Bluetooth multimedia device is lost, to resend said multimedia stream packet to said Bluetooth multimedia device, the Bluetooth chip being arranged to determine a fill rate of a buffer memory of at least one Bluetooth multimedia device, and to determine a maximum duration during which it can resend the lost multimedia stream packet to the Bluetooth multimedia device according to the fill rate of the buffer memory of the at least one Bluetooth multimedia device.

The invention specifically refers to a device for controlling Bluetooth multimedia devices in which the Bluetooth chip is arranged to generate several SEPs to control the Bluetooth multimedia devices.

The invention specifically refers to a device for controlling Bluetooth multimedia devices in which the Bluetooth chip is arranged to control up to five Bluetooth multimedia devices by using an SBC codec.

The invention specifically relates to a method for controlling Bluetooth multimedia devices in which the Bluetooth chip implements a modified A2DP profile so as to create a point-to-multipoint link from said Bluetooth chip to several Bluetooth multimedia devices, the Bluetooth chip streaming several interconnected multimedia streams, each to a respective Bluetooth multimedia device from among said several Bluetooth multimedia devices, based on a non-blocking Bluetooth usage.

The invention specifically relates to a method for controlling Bluetooth multimedia devices in which, when a multimedia stream packet that the Bluetooth chip transmitted to a Bluetooth multimedia device is lost, the Bluetooth chip resends said multimedia stream packet to said Bluetooth multimedia device, and determines a fill rate of a buffer memory of at least one Bluetooth multimedia device, to deduce a maximum duration during which it can resend the lost multimedia stream packet to the Bluetooth multimedia device according to the fill rate of the buffer memory of the at least one Bluetooth multimedia device.

The invention specifically refers to a method for controlling Bluetooth multimedia devices in which the Bluetooth chip generates several SEPs to control the Bluetooth multimedia devices.

The invention specifically refers to a method for controlling Bluetooth multimedia devices in which the Bluetooth chip controls five Bluetooth multimedia devices by using an SBC codec.

The invention specifically refers to a computer program comprising a series of instructions that, when they are executed by a processor, implements a method according to one aspect of the invention.

The invention specifically refers to a non-transitory computer-readable storage medium, storing a computer program according to one aspect of the invention.

BRIEF DESCRIPTION OF THE DRAWINGS

Other characteristics and advantages of the invention will appear upon reading the following description. The description is purely illustrative and should be read in conjunction with the appended drawings, in which.

DETAILED DESCRIPTION OF THE PREFERRED EMBODIMENTS

The following embodiments are examples. Although the description refers to one or more embodiments, this does not necessarily mean that each element mentioned in the context of an embodiment only relates to this same embodiment, or that the characteristics of this embodiment only apply to this embodiment.

FIG. 1 illustrates a communication between an A2DP' profile according to an embodiment of the invention used for a "Source" device (which corresponds to a device transmitting an audio stream) and a conventional A2DP profile used for a Sink device. For example, the Sink device corresponds to a Bluetooth speaker, recognizing that a Bluetooth speaker can comprise several Sink SEPs (several Sink SEPs can thus correspond to the same Bluetooth speaker, each Sink SEP can then specifically correspond to a respective codec from among all the codecs supported by this Bluetooth speaker).

In practice, the Bluetooth stacks of Bluetooth chip manufacturers only introduce a single Source SEP per codec and per Bluetooth chip. It is therefore impossible to connect several audio devices (speakers for example) to a portable telephone, for a given codec.

The A2DP' profile is accurately distinguished from the A2DP profile by a AVDTP' building block used instead of the AVDTP building block. The AVDTP' building block provides all the functions of the AVDTP building block but also enables a synchronized point-to-multipoint connection.

Figure 2:
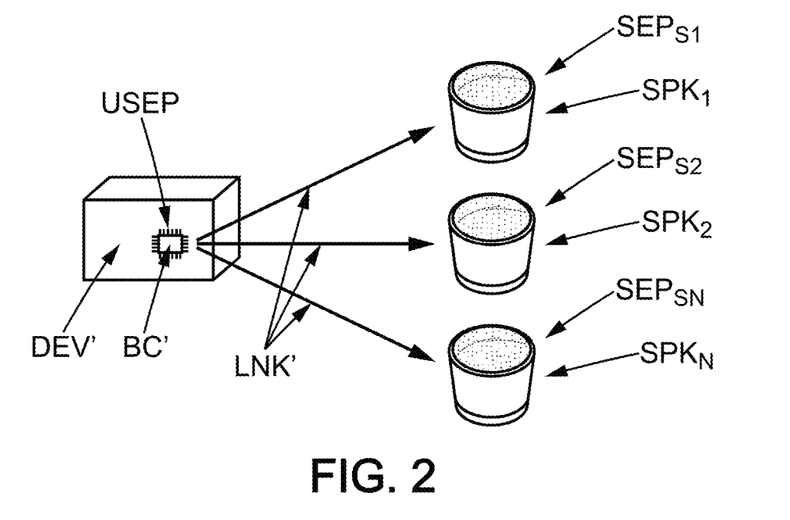
FIG. 2 illustrates a system comprising a device according to an embodiment of the invention as well as a set of Bluetooth speakers.

FIG. 2 illustrates a system comprising at least three Bluetooth speakers $SPK_1$, $SPK_2$ and $SPK_N$, each associated with a respective Sink SEP $SPE_{S1}$, $SEP_{S2}$, $SEP_{SN}$ (as mentioned previously, each $SPK_i$ speaker can be associated with several Sink SEPs rather than a single Sink SEP $SEP_{Si}$, but for simplification only the Sink SEP effectively used is represented). The system also comprises a DEV' device for controlling Bluetooth speakers according to a possible embodiment of the invention. The DEV' device comprises a Bluetooth chip BC'. This Bluetooth chip BC' stores a unique SEP USEP identifying it. This Bluetooth chip BC' establishes a point-to-multipoint link LNK' with three Bluetooth speakers $SPK_1$, $SPK_2$ and $SPK_N$, via respective SEPs $SEP_{S1}$, $SEP_{S2}$ and $SPE_{SN}$.

Figure 3:
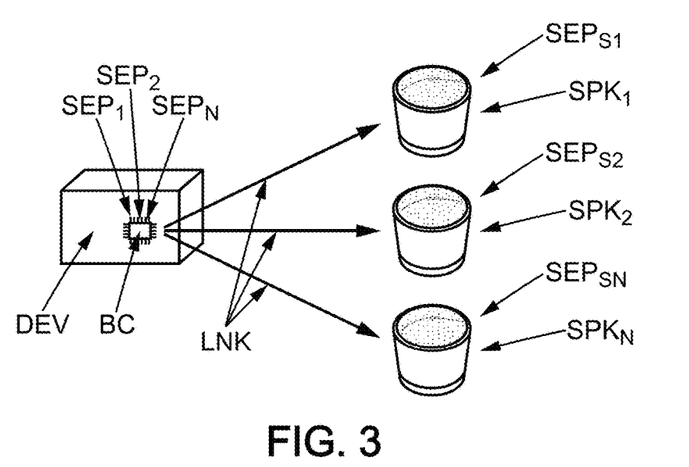
FIG. 3 illustrates a variation of the system from FIG. 2.

FIG. 3 illustrates a system comprising at least three Bluetooth speakers SPK1, SPK2 and SPKN each associated with a respective Sink SEP SPES1, SEPS2, SEPSN (as mentioned previously, each SPKi speaker can be associated with several Sink SEPs rather than a single Sink SEP SEPSi, but for simplification only the Sink SEP effectively used is represented). The system also comprises a DEV device for controlling Bluetooth speakers according to a possible embodiment of the invention. The DEV device comprises a Bluetooth chip BC. This Bluetooth chip BC stores at least three SEPs $SEP_1$, $SEP_2$ and $SEP_N$ that simulate three distinct Bluetooth chips (but they are virtual Bluetooth chips because in reality there is only one). The Bluetooth chip BC establishes a point-to-multipoint link LNK with the at least three Bluetooth speakers $SPK_1$, $SPK_2$ and $SPK_N$, but from the Bluetooth standard view, this link LNK appears to be a set of three (at least) point-to-point links. In fact, the SEP $SEP_1$ is connected to a SEP $SEP_{S1}$ of speaker $SPK_1$, the SEP $SEP_2$ is connected to a SEP $SEP_{S2}$ of speaker $SPK_2$ and the SEP $SEP_N$ is connected to a SEP $SEP_{SN}$ of speaker $SPK_N$.

A first embodiment relates to a device (for example DEV or DEV') for controlling Bluetooth multimedia devices, the controlling device comprising a Bluetooth chip (for example BC or BC').

The Bluetooth multimedia devices are, for example, Bluetooth speakers. Bluetooth speaker designates any Bluetooth device containing at least one speaker arranged to stream a sound that is simultaneously perceptible by several human beings. It may be, for example, a speaker for a hi-fi system, or else a portable telephone equipped with a speaker provided to be audible to several persons, insofar as it is this speaker that is controlled by the controlling device. More specifically, "sound that is simultaneously perceptible by several human beings" is understood to refer to a sound that is perceptible (in the sense where its content can be distinguished) by any human being with normal hearing placed at a distance of at least one meter from the speaker, in the presence of ambient noise corresponding to that of a conversation, or about 40 dB SPL. Therefore a headset, insert earphone or else a telephone ear piece are not speakers in the sense of the present application, because they must be applied against or in the ear to be able to perceive the transmitted sounds.

According to a possible implementation, Bluetooth multimedia devices are Bluetooth speakers. Such speakers are for example connected to a television and need to be synchronized to each other in addition to being synchronized with a video stream streamed on the television.

More generally, each of the Bluetooth multimedia devices can be a Bluetooth television, a Bluetooth screen, a Bluetooth portable telephone, a Bluetooth portable or office computer, a Bluetooth tablet, a Bluetooth hi-fi system, a Bluetooth car radio or else a Bluetooth digital music player.

The DEV or DEV' controlling device is, for example, a Bluetooth television, a Bluetooth screen, a Bluetooth portable telephone, a Bluetooth portable or office computer, a Bluetooth tablet, a Bluetooth hi-fi system, a Bluetooth car radio or else a Bluetooth digital music player.

The Bluetooth chip (for example BC or BC' in the figures) is arranged to implement a modified A2DP profile (noted A2DP' in FIG. 1) so as to create a point-to-multipoint link (for example LNK or LNK') from said Bluetooth chip to several Bluetooth multimedia devices $SPK_1$, $SPK_2$, $SPK_N$. The Bluetooth chip of the controlling device is arranged to stream several interconnected multimedia streams, each to a respective Bluetooth multimedia device from among said several Bluetooth multimedia devices, based on a non-blocking Bluetooth usage. "Interconnected" multimedia streams is understood to refer to multimedia streams referring to a same situation (for example a same scene, or a same music), but nevertheless can be different. For example, multimedia streams can be six audio streams each corresponding to one of the 5.1 channels of an audio recording, or else can be several videos of a same scene, filmed at the same time but from different views. The controlling device is, for example, arranged to transmit an audio stream (or more generally a multimedia stream) via a Bluetooth type wireless connection. For example, it stores or relays a multimedia stream comprising one audio channel at minimum. For example, it stores MP3 files, or is connected to a server (such as a Youtube® server) from which it downloads a stream that it progressively and simultaneously retransmits via Bluetooth, to several Bluetooth multimedia devices.

As it is based on a non-blocking Bluetooth usage instead of a blocking usage used by default in A2DP, the controlling device prevents synchronization losses. Non-blocking Bluetooth usage is understood to refer to any Bluetooth programming (by a Bluetooth mode and/or by other Bluetooth parameters) that prevents the Bluetooth chip from blocking the device for controlling Bluetooth multimedia devices. Therefore, a non-blocking Bluetooth usage is a Bluetooth usage that prevents forcing the Bluetooth chip from retransmitting an unreceived packet as long as it has not been received, which also prevents forcing such packet to be retransmitted beyond a time at which at least one Bluetooth multimedia device no longer has data in buffer memory due to, for example, unsuccessful attempts to retransmit the packet, which monopolizes the Bluetooth communications. A non-blocking usage corresponds to a set of parameters (FTO, QoS, Mode, Extended Flow features) and not only to a mode (such as the SM mode) in the sense of the Bluetooth standard. This is for example the "Flow Control" mode or any other mode for which the "Flush Timeout" parameter is set according to the Bluetooth standard to prevent any retransmission. On the contrary, a blocking usage is a usage that leads to, for example, retransmitting data as long as the data are not received, or that leads to retransmitting data while a higher priority Bluetooth multimedia device is also waiting for data and has not received the data due to said usage (it is then blocked). The blocking usage is used in the prior art because it prevents occasional data losses (in the event of prolonged power cuts for a duration longer than a given threshold, the blocking usage is not able to prevent data losses). Assuming Bluetooth was adapted to enable point-to-multipoint streaming, employing a non-blocking usage prevents the risk that a Bluetooth multimedia device becomes inaccessible and prevents any data transmission to all Bluetooth multimedia devices. For example, a Bluetooth multimedia device can become inaccessible because it was moved out of range of the Bluetooth chip of the DEV controlling device, or because it contains a spent battery, or for any other reason.

The default Bluetooth L2CAP parameters noted in the introduction are not suitable for establishing a synchronized A2DP connection of a source Bluetooth device to several sink Bluetooth devices. In fact if one of the links established between the source and a sink (for example a speaker) is configured with an infinite "Flush Timeout," and if the speaker exits the Bluetooth field or if it is powered by a spent battery, then the data will continuously be resent to it which, not receiving the data, will block any other data transmission to other sink devices (the data being sent sequentially). In addition, if the "Flush Timeout" parameter is defined by default, sending data over a speaker would lead to a time lag between it and the others. In fact, when a speaker outside of the Bluetooth field of the source Bluetooth device returns to this field, it continues delivering the stream from the time it stopped by exiting this field.

According to a possible implementation, the device for controlling Bluetooth multimedia devices is arranged to automatically determine, from various configurations supported by Bluetooth stacks of Bluetooth multimedia devices, the programming to adopt for each L2CAP channel (corresponding to a logical link between the Bluetooth chip of the device for controlling Bluetooth speakers and a Bluetooth multimedia device) so as to maintain a synchronized link between the device for controlling Bluetooth multimedia devices and the various sink multimedia devices. The L2CAP parameters of each of the multimedia devices may be different (they can depend on the characteristics of these multimedia devices, their ability to support certain protocols, etc.).

According to a possible implementation, the device for controlling Bluetooth multimedia devices is arranged to configure all "Flush Timeouts" for the different L2CAP channels at the value defined by the Bluetooth standard (i.e., 1, but this can vary according to the implementations) so that no retransmission is performed. The link thus obtained is not reliable in the sense that transmission errors or losses are not caught, but ensures synchronization after a possible loss of packets.

According to a possible implementation, the A2DP profile modification consists of modifying the AVDTP building block used by the A2DP profile, for example in one of the ways indicated below. In order to produce a AVDTP' building block corresponding to a modified AVDTP building block, it is possible, in particular, to use a free implementation such as the implementation known as BlueZ (well known to the person skilled in the art), designed to implement Bluetooth technology on Linux type operating systems, and available under GNU GPL license. The BlueZ implementation has become a reference Bluetooth implementation for Linux and has been integrated into the Linux kernel.

According to a second embodiment, the Bluetooth chip of a device for controlling Bluetooth multimedia devices according to the first embodiment is arranged, when a multimedia stream packet that it transmitted to a Bluetooth multimedia device is lost, to resend said multimedia stream packet to said Bluetooth multimedia device. The Bluetooth chip is arranged to determine a fill rate of a buffer memory of at least one Bluetooth multimedia device $SPK_1$, $SPK_2$, $SPK_N$ and to determine a maximum duration during which it can resend the lost multimedia stream packet to the Bluetooth multimedia device according to the fill rate of the buffer memory of the at least one Bluetooth multimedia device.

According to a possible implementation, this maximum duration corresponds to the least filled buffer memory among the buffer memories of all the other Bluetooth multimedia devices, for which it must deduce the time necessary for transmitting a sufficient portion of the multimedia stream. Therefore the content of the buffer memory of the Bluetooth multimedia device that lost a packet is not taken into account.

According to another implementation, this maximum duration corresponds to the least filled buffer memory among the buffer memories of all the Bluetooth multimedia devices (including the one that lost the packet), for which it must deduce the time necessary for transmitting a sufficient portion of the multimedia stream. In fact, if the Bluetooth multimedia device that lost the packet runs the risk of running out of multimedia stream data to play, it can be considered more appropriate to abandon the attempt to retransmit the lost packet, which in any case would be restored as delayed and thus desynchronized from the other Bluetooth multimedia devices.

According to another implementation, the Bluetooth chip is arranged to identify the Bluetooth multimedia devices for which it is unnecessary to verify the fill rate of the buffer memory. For example, the Bluetooth chip can exclude a number n of Bluetooth multimedia devices in which it powered the buffer memories last, if it can deduce that other Bluetooth multimedia devices necessarily exist in which the buffer memory is less filled and which will determine the aforementioned maximum duration.

According to another implementation, the Bluetooth chip is arranged to store an identifier of the Bluetooth multimedia device, the buffer memory of which it powered longest. When a packet is lost, the Bluetooth chip then only verifies the buffer memory of this Bluetooth multimedia device, the buffer memory of which it powered longest.

According to a possible implementation, the controlling device is arranged to transmit portions of audio stream of about 14 ms (which corresponds to the duration of an audio stream block encoded by the SBC codec). According to a possible implementation, the controlling device controls four Bluetooth multimedia devices, and the transmission of a portion of about 14 ms takes about 1.3 ms. Thus it takes about 4*1.3 ms or about 5.2 ms to transmit about 14 ms of stream to the four Bluetooth multimedia devices, which leaves about 14 ms-5.2 ms or about 8.8 ms during which the controlling device can identify the packets that were improperly transmitted or not transmitted and retransmit them.

According to a possible implementation, the device for controlling Bluetooth multimedia devices is arranged to configure the "Flush Timeout" of each L2CAP channel depending on the fill state of the buffer memories of the Bluetooth multimedia devices, that it must estimate beforehand for example by one of the aforementioned methods.

According to a possible implementation, the Bluetooth chip of a device for controlling Bluetooth multimedia devices according to the first embodiment is arranged to generate a unique SEP to control all Bluetooth multimedia devices. More specifically, the A2DP profile of the Source SEP (the Bluetooth chip) is modified, for example by substituting a conventional AVDTP building block for a modified AVDTP' building block. The modification consists of removing restrictions preventing a Source SEP from connecting to more than one Sink SEP. Consequently the Bluetooth standard does not involve verifying, at the level of a Sink SEP, that the Source SEP with which it dialogues does not also dialogue with another Sink SEP. Technically, it turns out that multimedia streams (particularly audio) can be streamed from a same Source SEP to several Sink SEPs from a same Bluetooth chip.

As the Bluetooth standard does not enable a Source SEP to be communicated to several Sink SEPs, the present implementation constitutes a form of extension to the Bluetooth standard, an extension that does not produce difficulties insofar as the Bluetooth standard is not provided to detect such an extension.

Of course, it is possible to provide several Bluetooth chips in the device for controlling Bluetooth multimedia devices, each chip arranged to generate a unique SEP to control the Bluetooth multimedia devices respectively managed by each of them. For example, a Bluetooth chip number 1 can manage multimedia devices numbers 1 to 5, a Bluetooth chip number 2 can manage multimedia devices numbers 6 to 10 and a Bluetooth chip number 3 can manage multimedia devices numbers 11 to 15. In fact, the maximum speed of a Bluetooth chip limits the number of multimedia devices that it can control, and if the number of multimedia devices exceeds a given threshold, adding a Bluetooth chip enables additional multimedia devices to be simultaneously controlled.

According to a third embodiment, the Bluetooth chip of a device for controlling Bluetooth multimedia devices according to the first or second embodiment is arranged to generate several SEPs to control the Bluetooth multimedia devices.

According to an advantageous embodiment, the Bluetooth chip generates a distinct Source SEP for each Sink SEP (corresponding to each Bluetooth multimedia device that it must control). This is an alternative to the aforementioned implementation, in which the Bluetooth chip more closely conforms to the Bluetooth standard. In fact, it seemingly has point-to-point links, and not a point-to-multipoint link. But it is of course a device, which consists of generating a multiplicity of virtual Source SEPs in a same Bluetooth chip to simulate a multiplicity of Source devices where in reality there is only a single Bluetooth chip.

Of course, it is possible to provide several Bluetooth chips in the device for controlling Bluetooth multimedia devices, each chip arranged to generate as many Source SEPs as the Bluetooth multimedia devices respectively managed by each of them. For example, a Bluetooth chip number 1 can manage Bluetooth multimedia devices numbers 1 to 5 using respective Source SEPs $SEP_1$ to $SEP_5$, a Bluetooth chip number 2 can manage Bluetooth multimedia devices numbers 6 to 10 using respective Source SEPs $SEP_6$ to $SEP_{10}$ and a Bluetooth chip number 3 can manage Bluetooth multimedia devices numbers 11 to 15 using respective Source SEPs $SEP_{11}$ to $SEP_{15}$. In fact, the maximum speed of a Bluetooth chip limits the number of multimedia devices that it can control, and if the number of multimedia devices exceeds a given threshold, adding a Bluetooth chip enables additional multimedia devices to be controlled simultaneously. The number of Source SEPs generated by a Bluetooth chip does not influence the available bandwidth in this Bluetooth chip, which remains the same but is shared between these different Source SEPs. According to a possible implementation, the Bluetooth chip creates a maximum of 7 source SEPs to manage the Bluetooth multimedia devices that it controls by using a piconet. A piconet is a network comprising from 1 to 8 Bluetooth devices, including a single Source Bluetooth device and up to 7 Sink Bluetooth devices, as specified by the Bluetooth standard. The limitation to 7 Sink devices per Source device originates from Bluetooth addressing which identifies each sink Bluetooth device using three bits, the combination 000 being reserved for a specific mode called "Connectionless Broadcast."

According to a fourth embodiment, the Bluetooth chip of a device for controlling Bluetooth multimedia devices according to one of the first to the third embodiments is arranged to control up to five Bluetooth multimedia devices, by using an SBC codec. "To control up to five Bluetooth multimedia devices" is understood to mean that whatever the SBC audio stream delivered, it is possible to deliver this stream to five speakers. If there are fewer than five speakers, it is a fortiori possible.

A CD-quality stereo audio stream is sampled at 44.1 kHz and samples the audio signal on 16 bits. Each second, 44100 16-bit samples are thus provided for the left side and 44100 other 16-bit samples are provided for the right side. The raw throughput of such a stream is therefore 44100*2*16 bit/s or a little over 1.4 Mbit/s. Such a speed is very high, and it is therefore useful to compress it to reduce the bandwidth necessary during transmission, particularly a Bluetooth transmission, the speed of which is not very high. Codecs are used to carry out this compression. An SBC codec is a very simple and effective codec. Effective means that the SBC codec only requires very little memory resources and processor resources to operate. This is very useful for Bluetooth chips, which are often limited in processing power memory. The SBC codec is also free. It is also advantageous because it is very widespread, and thus ensures high interoperability. However, it is rather underperforming in terms of the compression rate and audio quality obtained. The bit rate of an audio stream encoded by an SBC codec is at most 372 kbit/s (in certain cases, SBC generates a lower bit rate, particularly to adapt to the available bandwidth, thus enabling more than five Bluetooth multimedia devices to be controlled, if necessary). But better performing codecs exist. For example, an AAC codec generates a compressed audio stream of about 192 kbit/s with a quality substantially equivalent to that of an SBC stream at 372 kbit/s. AptX codecs also enable improved performance (lower rate at equivalent quality), but are not free.

The Bluetooth bandwidth for compatible EDR ("Enhanced Data Rate") devices such as conventional Bluetooth speakers is 2.1 Mbit/s. It is thus possible to transmit at a minimum five streams encoded by an SBC codec (at 372 kbit/s maximum) in the available bandwidth.

According to a possible implementation, the Bluetooth chip uses an AAC codec, which in theory enables ten (practically eleven) streams encoded in AAC to be transmitted at 192 kbit/s. It is nevertheless advantageous, according to a possible implementation, to limit the number of AAC streams to seven to be able to put a piconet in place according to the Bluetooth standard (which limits the number of sink devices to 7). According to other alternatives, other codecs are used, enabling up to seven encoded streams to be transmitted, or fewer if the encoded stream rate is greater than 300 kbit/s (in this case the number of possible encoded streams is equal to the ratio of 2100000 by the rate of an encoded stream expressed in bit/s).

A fifth embodiment refers to a method of controlling Bluetooth multimedia devices by a Bluetooth chip. The Bluetooth chip implements a modified A2DP profile (noted A2DP') so as to create a point-to-multipoint link from said Bluetooth chip to several Bluetooth multimedia devices, the Bluetooth chip streaming several interconnected multimedia streams, each to a respective Bluetooth multimedia device from among said several Bluetooth multimedia devices, based on a non-blocking Bluetooth usage.

According to a possible implementation, the Bluetooth chip comprises a processor and executes a computer program adapted to implement an A2DP' profile so as to create a point-to-multipoint link from said Bluetooth chip to several Bluetooth multimedia devices, the Bluetooth chip streaming several interconnected multimedia streams, each to a respective Bluetooth multimedia device from among said several Bluetooth multimedia devices, based on a non-blocking Bluetooth usage.

According to an alternative implementation, this is a device for controlling Bluetooth multimedia devices comprising said Bluetooth chip that also comprises a processor and executes a computer program adapted to implement an A2DP' profile so as to create a point-to-multipoint link from said Bluetooth chip to several Bluetooth multimedia devices, the Bluetooth chip streaming several interconnected multimedia streams, each to a respective Bluetooth multimedia device from among said several Bluetooth multimedia devices, based on a non-blocking Bluetooth usage.

In the two aforementioned implementations, the computer program is stored in a memory (for example of the EEPROM, Flash or else ROM type). This memory can be implanted in the Bluetooth chip or in the device for controlling Bluetooth multimedia devices, outside of the Bluetooth chip. According to a variation, the computer program is stored partly in the Bluetooth chip, and partly in the device for controlling Bluetooth multimedia devices. According to a variation, the device for controlling Bluetooth multimedia devices and the Bluetooth chip each comprises at least one distinct processor, and each executes part of the computer program, which is stored either in a single place (unique memory chip) or is distributed over several memory chips (for example a memory chip of the Bluetooth chip and a memory chip of the device for controlling Bluetooth multimedia devices).

According to another implementation, the method is implemented not by a computer program but by a dedicated electronic chip, which is for example an FPGA or any other appropriate circuit, including an ad hoc circuit. According to a variation, the method is partially implemented by a dedicated electronic chip such as an aforementioned dedicated chip, and partially by a processor executing an appropriate computer program.

According to a sixth embodiment, the Bluetooth chip of a method for controlling Bluetooth multimedia devices according to the fifth embodiment, when a multimedia stream packet that the Bluetooth chip transmitted to a Bluetooth multimedia device is lost, the Bluetooth chip resends said multimedia stream packet to said Bluetooth multimedia device, and determines a fill rate of a buffer memory of each Bluetooth multimedia device $SPK_1$, $SPK_2$, $SPK_N$, to deduce a maximum duration during which it can resend the lost multimedia stream packet to the Bluetooth multimedia device according to the fill rate of the buffer memory of the Bluetooth multimedia device.

According to a seventh embodiment, the Bluetooth chip of a method for controlling Bluetooth multimedia devices according to the fifth or sixth embodiment generates several SEPs $SEP_1$, $SEP_2$, ... $SEP_N$ to control the Bluetooth multimedia devices $SPK_1$, $SPK_2$, ... $SPK_N$.

According to an eighth embodiment, the Bluetooth chip of a method for controlling Bluetooth multimedia devices according to one of the fifth to the seventh embodiments controls five Bluetooth multimedia devices, by using an SBC codec.

A ninth embodiment refers to a computer program comprising a series of instructions that, when they are executed by a processor, implements a method according to one of the fifth to the eighth embodiments. This computer program is, for example, written in a low-level language such as an assembler language, or in a higher-level, more portable language such as C language. According to a possible implementation, the computer program is divided into several modules. According to a possible implementation, the various modules are all written in the same language, for example the C or assembler language. According to an alternative, certain modules are written in different languages, for example certain modules are written in C language, others in assembler language. According to a possible implementation, all modules are stored in a same memory. According to an alternative, certain modules are stored in distinct memories.

A tenth embodiment refers to a non-transitory computer-readable storage medium, storing a computer program according to the ninth embodiment. According to a possible implementation, the storage medium is a USB key, an SD card or a micro SD card. According to a variation, the storage medium is any memory card. According to another variation, the storage medium is a memory chip intended to be mounted on an electronic circuit. For example, it is an EEPROM, ROM, or else Flash memory. According to a possible variation, the storage medium is a magnetic (for example of the hard disc type) or else optical (for example of the CD or DVD type) medium.

The invention is not limited to the embodiments described above by way of example. The usable memories cover any type of memory.

The embodiments described in relation to the device for controlling Bluetooth multimedia devices can be applicable to the methods for controlling Bluetooth multimedia devices, as well as to the computer programs and storage media of the program according to the embodiments of the invention, and vice-versa.

The invention is claimed is:

1. A device for controlling Bluetooth multimedia devices, wherein the controlling device comprises a single Bluetooth chip arranged to implement an A2DP profile modified so as to create a point-to-multipoint link from said Bluetooth chip to several Bluetooth multimedia devices, the Bluetooth chip of the controlling device being arranged to stream several interconnected multimedia streams via the point-to-multipoint link, each to a respective Bluetooth multimedia device from among said several Bluetooth multimedia devices, based on a non-blocking Bluetooth usage, the non-blocking Bluetooth usage preventing forcing the Bluetooth chip from retransmitting an unreceived packet as long as it has not been received.

2. The device for controlling Bluetooth multimedia devices according to claim 1, wherein the Bluetooth chip is arranged, when a multimedia stream packet that it transmitted to a Bluetooth multimedia device is lost, to resend said multimedia stream packet to said Bluetooth multimedia device, the Bluetooth chip being arranged to determine a fill rate of a buffer memory of at least one Bluetooth multimedia device, and to determine a maximum duration during which it can resend the lost multimedia stream packet to the Bluetooth multimedia device according to the fill rate of the buffer memory of the at least one Bluetooth multimedia device.

3. The device for controlling Bluetooth multimedia devices according to claim 1, in which the Bluetooth chip is arranged to control up to five Bluetooth multimedia devices by using an SBC codec.

4. A method for controlling Bluetooth multimedia devices by a single Bluetooth chip, wherein the Bluetooth chip implements an A2DP modified so as profile to create a point-to-multipoint link from said Bluetooth chip to several Bluetooth multimedia devices, the Bluetooth chip streaming several interconnected multimedia streams via the point-to-multipoint link, each to a respective Bluetooth multimedia device from among said several Bluetooth multimedia devices, based on a non-blocking Bluetooth usage, the non-blocking Bluetooth usage preventing forcing the Bluetooth chip from retransmitting an unreceived packet as long as it has not been received.

5. The method for controlling Bluetooth multimedia devices according to claim 4, wherein, when a multimedia stream packet that the Bluetooth chip transmitted to a Bluetooth multimedia device is lost, the Bluetooth chip resends said multimedia stream packet to said Bluetooth multimedia device, and determines a fill rate of a buffer memory of at least one Bluetooth multimedia device, to deduce a maximum duration during which it can resend the lost multimedia stream packet to the Bluetooth multimedia device according to the fill rate of the buffer memory of the at least one Bluetooth multimedia device.

6. The method for controlling Bluetooth multimedia devices according to claim 4, wherein the Bluetooth chip controls five Bluetooth multimedia devices by using an SBC codec.

7. A non-transitory computer-readable storage medium, storing a computer program comprising a series of instructions that, when they are executed by a processor, implements a method according to claim 4.

* * * * *